US012792417B2

(12) United States Patent
Leland et al.

(10) Patent No.: US 12,792,417 B2
(45) Date of Patent: Nov. 10, 2026

(54) SYSTEMS AND METHODS FOR OPTIMAL WORKLOAD ORCHESTRATION USING SHARED LAYERS

(71) Applicant: Dell Products L.P., Round Rock, TX (US)

(72) Inventors: Jake M. Leland, Round Rock, TX (US); Fabricio C. Duarte, Stanwood, WA (US); Uboho Victor, San Antonio, TX (US); Jyoti J. Luu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 411 days.

(21) Appl. No.: 18/419,254

(22) Filed: Jan. 22, 2024

(65) Prior Publication Data

US 2025/0238277 A1 Jul. 24, 2025

(51) Int. Cl.
*G06F 9/50* (2006.01)

(52) U.S. Cl.
CPC .......... *G06F 9/5055* (2013.01); *G06F 9/5072* (2013.01)

(58) Field of Classification Search
None
See application file for complete search history.

(56) References Cited

U.S. PATENT DOCUMENTS

2017/0177860 A1 * 6/2017 Suarez .................... G06F 21/53

OTHER PUBLICATIONS

Deze Zeng; "Layered Structure Aware Dependent Microservice Placement Toward Cost Efficient Edge Clouds", IEEE INFOCOM 2023—IEEE Conference on Computer Communications (Year: 2023).*

Yicheng Feng, "Quicklayer: A Layer-Stack-Oriented Accelerating Middleware for Fast Deployment in Edge Cloud" APNet '23: Proceedings of the 7th Asia-Pacific Workshop on Networking (Year: 2023).*

* cited by examiner

*Primary Examiner* — Wynuel S Aquino

(74) *Attorney, Agent, or Firm* — Jackson Walker L.L.P.

(57) ABSTRACT

An information handling system may include a processor and a workload orchestrator comprising a program of instructions configured to, when read and executed by the processor, in a distributed ecosystem comprising a plurality of host systems, responsive to a request to place a workload for execution in the distributed ecosystem: determine required software layers for a container image for executing the workload; determine candidate host systems among the plurality of host systems for execution of the workload; determine for each candidate host system the required software layers for the container image that are absent from such host system; based on the required software layers for the container image that are absent from the candidate host systems, calculate a score for each candidate host system; and cause the container for the workload to be instantiated on a selected host system that has the best score among the candidate host systems.

21 Claims, 2 Drawing Sheets

SYSTEMS AND METHODS FOR OPTIMAL WORKLOAD ORCHESTRATION USING SHARED LAYERS

TECHNICAL FIELD

The present disclosure relates in general to information handling systems, and more particularly to methods and systems for optimally orchestrating workloads in a distributed system using shared layers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a distributed computing system, the ecosystem may have a plurality of distributed computing endpoints, each endpoint capable of instantiating containers for executing workloads. Containerization is an increasingly popular method of packaging and distributing software, with benefits in security, portability, and scalability. Workloads running in containers may be easily moved, or "offloaded," to machines better suited for the task.

In a distributed computing system, containers may be used to distribute workloads among various virtual or physical machines at a user's disposal. Existing orchestration solutions provide methods of placing (i.e., scheduling) workloads based on hardware requirements such as processor and/or memory hardware availability, for example. However, existing approaches do not take into account software components available at an information handling system when placing workloads.

SUMMARY

In accordance with the teachings of the present disclosure, the disadvantages and problems associated with existing approaches to workload distribution may be reduced or eliminated.

In accordance with embodiments of the present disclosure, an information handling system may include a processor and a workload orchestrator comprising a program of instructions configured to, when read and executed by the processor, in a distributed ecosystem comprising a plurality of host systems, responsive to a request to place a workload for execution in the distributed ecosystem: determine required software layers for a container image for executing the workload; determine candidate host systems among the plurality of host systems for execution of the workload; determine for each candidate host system the required software layers for the container image that are absent from such host system; based on the required software layers for the container image that are absent from the candidate host systems, calculate a score for each candidate host system; and cause the container for the workload to be instantiated on a selected host system that has the best score among the candidate host systems.

In accordance with these and other embodiments of the present disclosure, a method may include, in a distributed ecosystem comprising a plurality of host systems, responsive to a request to place a workload for execution in the distributed ecosystem: determining required software layers for a container image for executing the workload; determining candidate host systems among the plurality of host systems for execution of the workload; determining for each candidate host system the required software layers for the container image that are absent from such host system; based on the required software layers for the container image that are absent from the candidate host systems, calculating a score for each candidate host system; and causing the container for the workload to be instantiated on a selected host system that has the best score among the candidate host systems.

In accordance with these and other embodiments of the present disclosure, an article of manufacture comprising a non-transitory computer-readable medium and computer-executable instructions carried on the computer-readable medium, the instructions readable by a processor, the instructions, when read and executed, for causing the processor to, in a distributed ecosystem comprising a plurality of host systems, responsive to a request to place a workload for execution in the distributed ecosystem: determine required software layers for a container image for executing the workload; determine candidate host systems among the plurality of host systems for execution of the workload; determine for each candidate host system the required software layers for the container image that are absent from such host system; based on the required software layers for the container image that are absent from the candidate host systems, calculate a score for each candidate host system; and cause the container for the workload to be instantiated on a selected host system that has the best score among the candidate host systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
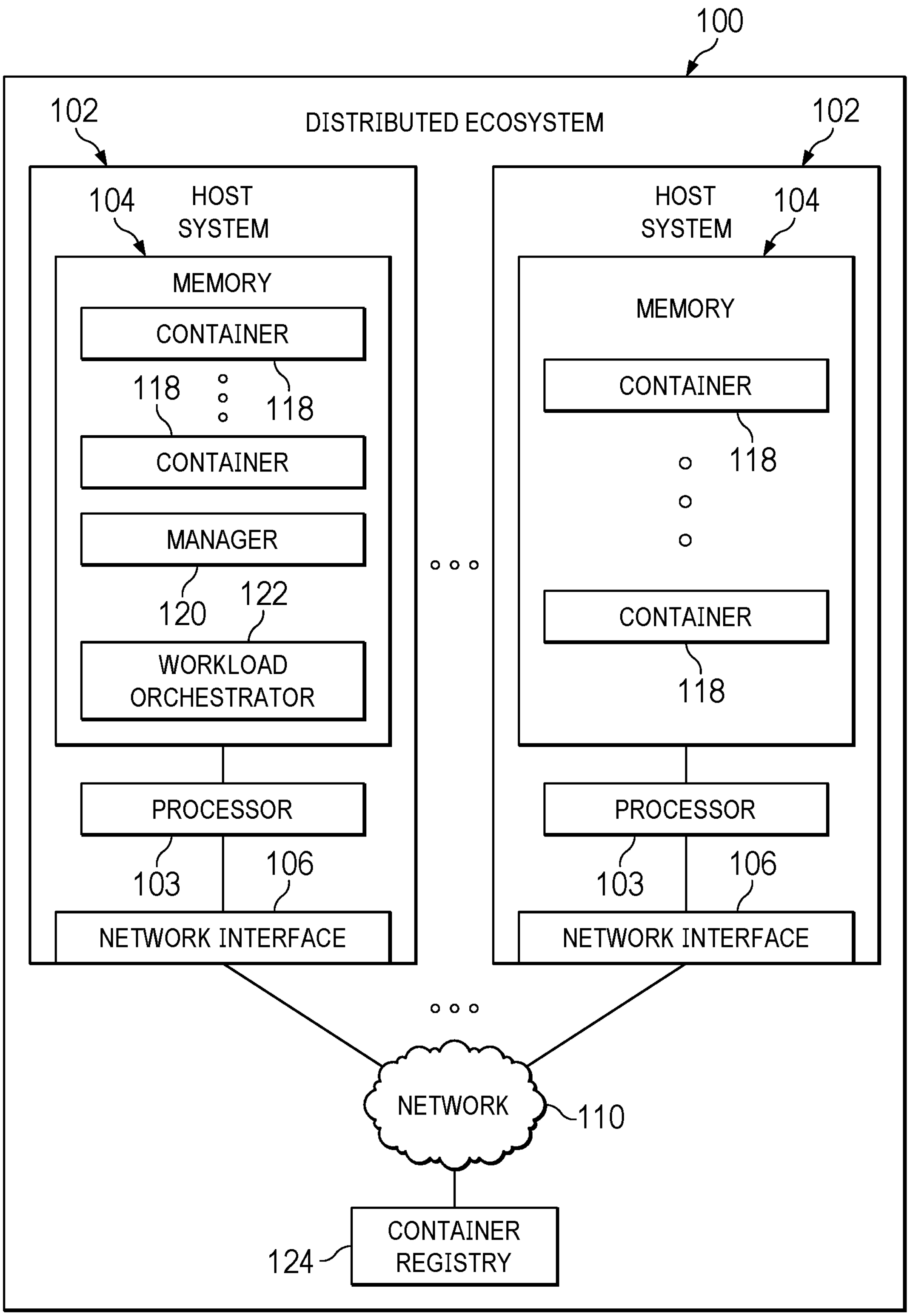
FIG. 1 illustrates a block diagram of selected components of an example distributed ecosystem, in accordance with embodiments of the present disclosure.
Figure 2:
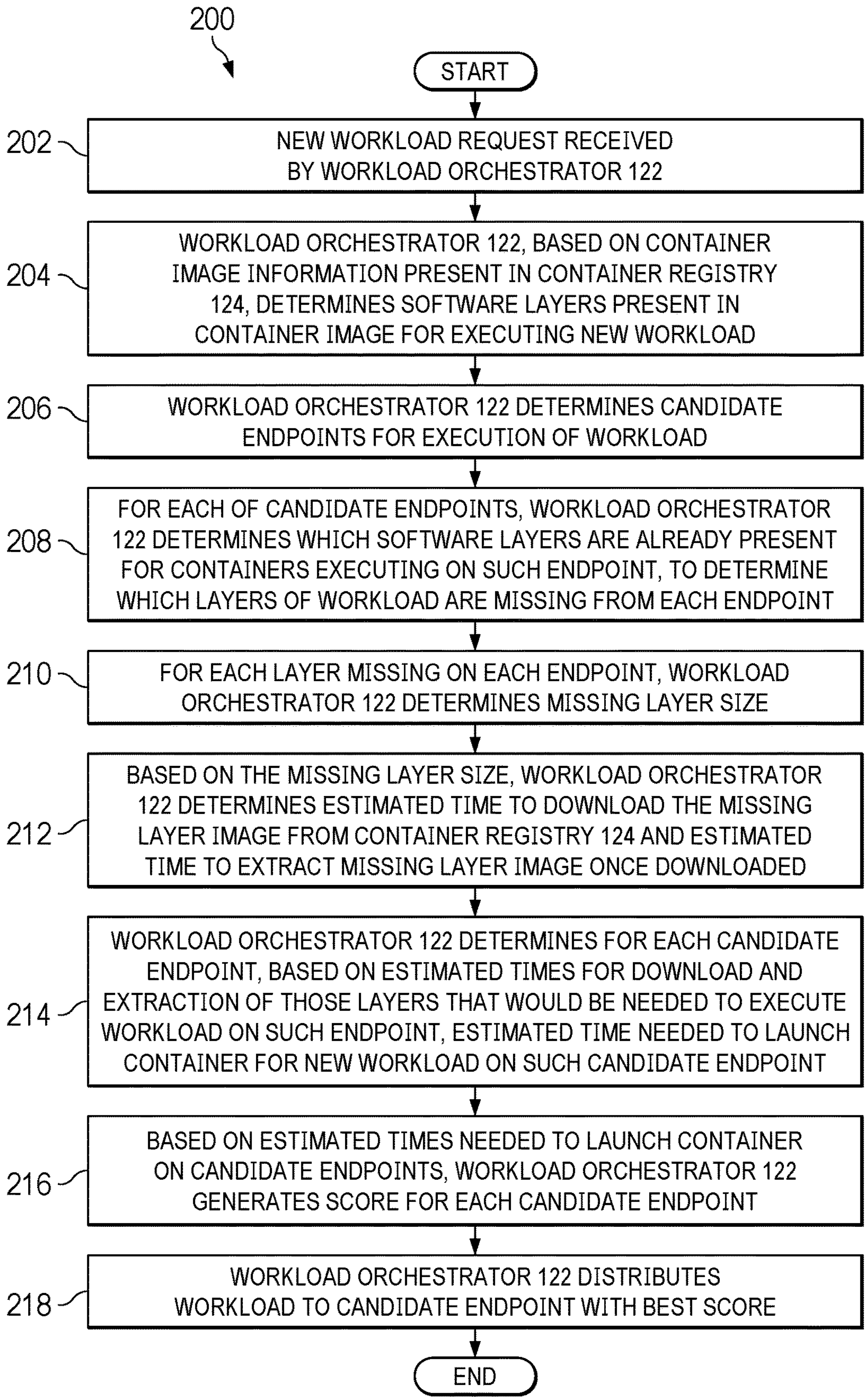
FIG. 2 illustrates a flow chart of an example method for optimizing distribution of workloads among endpoints based on shared layers, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of selected components of an example distributed ecosystem 100 having a plurality of host systems 102, in accordance with embodiments of the present disclosure. As shown in FIG. 1, distributed ecosystem 100 may include a plurality of host systems 102 coupled to one another via a network 110. In some embodiments, two or more of the plurality of host systems 102 may be co-located in the same geographic location (e.g., building or data center). In these and other embodiments, two or more of the plurality of host systems 102 may be co-located in the enclosure, rack, or chassis. In these and other embodiments, two or more of the plurality of host systems 102 may be located in substantially different geographic locations.

A host system 102 may comprise an information handling system. In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, host system 102 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

As used herein, a host system 102 may sometimes be referred to herein as an "endpoint" of distributed ecosystem 100.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to host system 102 is turned off.

As shown in FIG. 1, a memory 104 may have stored thereon one or more containers 118. In some embodiments, containers 118 may be stored in a computer-readable medium (e.g., a local or remote hard disk drive) other than a memory 104 which is accessible to processor 103.

A container 118 or containerized application may include instructions for a container runtime to virtualize a computer's operating system kernel, enabling users to install containers (e.g., isolated application environments) on a virtualized operating system. Containerized applications may be built based on a containerfile, which is an ordered list of instructions on how to set up an environment and install an application. Each command in such ordered list may become a subsequent layer in the final container image. Often, the first few instructions in this containerfile will install libraries that the application needs to run, forming layers that are effectively "independent" and thus good candidates for sharing across other container images.

At least one host system 102 in system 100 may have stored within its memory 104 a manager 120. A manager 120 may comprise software and/or firmware generally operable to manage containers 118 instantiated on each host system 102, including controlling migration of containers between host systems 102. Further, as described in greater detail below, a manager 120 may perform session management to maintain mappings of user sessions across endpoints.

At least one host system 102 in system 100 may have stored within its memory 104 a workload orchestrator 122. As described in greater detail below, workload orchestrator 122 may comprise software and/or firmware generally operable to optimize workload placement in container-based environments. Workload orchestrator 122 may inspect candidate endpoints that meet hardware requirements for a workload to be placed and may score the candidate endpoints according to the number of shared layers already available on the endpoint and the time expected to download and extract any unavailable layers. Such calculation incorporates metrics for endpoints' network conditions, observed layer extraction times, and potential for peer-to-peer layer transfer. Based on the scores for the candidate endpoints, workload orchestrator 122 may also select an endpoint for the workload from among the candidate endpoints.

A network interface 106 may include any suitable system, apparatus, or device operable to serve as an interface between an associated host system 102 and network 110. A network interface 106 may enable its associated host system 102 to communicate with network 110 using any suitable transmission protocol (e.g., TCP/IP) and/or standard (e.g., IEEE 802.11, Wi-Fi). In certain embodiments, a network interface 106 may include a physical network interface controller (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable network interface cards, including without limitation, mezzanine cards, network daughter cards, etc.

Network 110 may be a network and/or fabric configured to communicatively couple information handling systems to each other. In certain embodiments, network 110 may include a communication infrastructure, which provides physical connections, and a management layer, which organizes the physical connections of host systems 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Fibre Channel over Ethernet (FCOE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In addition to processor 103, memory 104, and network interface 106, a host system 102 may include one or more other information handling resources.

As shown in FIG. 1, distributed ecosystem 100 may also include a container registry 124 communicatively coupled to network 110. Container registry 124 may include a repository of container images that may be instantiated as containers 118 on host systems 102, including the various software layers that may make up each of such container images. Accordingly, container registry 124 may be used by workload orchestrator 122 to determine the contents of a container image for a workload, including the software layers that may make up the container image. Further, when a workload is placed in a container on an endpoint, container registry 124 may serve as a source for layers requiring download onto the endpoint in order to instantiate the container on the endpoint. In some embodiments, container registry 124 may reside on a host system 102 of distributed ecosystem 100.

FIG. 2 illustrates a flow chart of an example method 200 for optimizing distribution of workloads among endpoints based on shared layers, in accordance with embodiments of the present disclosure. According to some embodiments, method 200 may begin at step 202 and may be implemented in a variety of configurations of distributed ecosystem 100. As such, the preferred initialization point for method 200 and the order of the steps comprising method 200 may depend on the implementation chosen.

At step 202, a new workload request may be received by workload orchestrator 122. At step 204, workload orchestrator 122 may, based on container image information present in container registry 124, determine the software layers present in a container image for executing the new workload.

At step 206, workload orchestrator 122 may determine candidate endpoints for execution of the workload. For example, based on hardware requirements for the requested workload, workload orchestrator 122 may identify the endpoints within distributed ecosystem 100 that satisfy such hardware requirements as the candidate endpoints.

At step 208, for each of the candidate endpoints, workload orchestrator 122 may determine which software layers are already present for containers executing on the endpoint, in order to further determine which layers of the workload are missing from each endpoint.

At step 210, for each layer missing on each endpoint, workload orchestrator 122 may determine the missing layer size. At step 212, based on the missing layer size, workload orchestrator 122 may determine estimated time to download the missing layer image from container registry 124 and estimated time to extract the missing layer image once downloaded. Such estimated times may be estimated based on missing layer size, and one or more parameters associated with the candidate endpoint to which the layer would need to be installed, including without limitation such endpoint's network conditions, observed layer extraction times, and peer-to-peer layer transfer.

At step 214, workload orchestrator 122 may determine for each candidate endpoint, based on estimated times for download and extraction of those layers that would be needed to execute the workload on such endpoint, an estimated time needed to launch the container for the new workload on such candidate endpoint. At step 216, based on the estimated times needed to launch the container on the candidate endpoints, workload orchestrator 122 may generate a score for each candidate endpoint.

At step 218, workload orchestrator 122 may distribute the workload to the candidate endpoint with the best score, including causing a container for the workload to be instantiated on the selected candidate endpoint, and download of software layers from container registry 124 needed to instantiate such container.

After completion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using distributed ecosystem 100 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:

a processor; and a workload orchestrator comprising a program of instructions configured to, when read and executed by the processor, in a distributed ecosystem comprising a plurality of host systems, responsive to a request to place a workload for execution in the distributed ecosystem:

determine required software layers for a container image for executing the workload;

determine candidate host systems among the plurality of host systems that meet hardware requirements for the execution of the workload; and calculate, for each of the determined candidate host systems of the plurality of host systems a score;

wherein calculating the score for each of the determined candidate host systems comprises:

determining required software layers for the container image that are absent from the candidate host system;

determining a number of shared layers already available on the candidate host system;

determining a time expected to download and extract the determined absent layers;

based on the determined absent layers, the determined number of shared layers, and the determined time, calculating the score; and causing the container for the workload to be instantiated on a selected candidate host system that has the best score among the determined candidate host systems.

2. The information handling system of claim 1, wherein determining the required layers for the container image comprises reading a container registry including information regarding the container and its constituent software layers.

3. The information handling system of claim 1, wherein determining the candidate host systems among the plurality of host systems that meet the hardware requirements for execution of the workload comprises determining which of the plurality of host systems meet the hardware requirements for the workload.

4. The information handling system of claim 1, wherein calculating the score for each candidate host system comprises, for such candidate host system:

determining an estimated time for launching the container on such candidate host system; and calculating the score based on the estimated time.

5. The information handling system of claim 4, wherein determining the estimated time for launching the container on such candidate host system comprises, for each required software layer absent from such candidate host system:

determining a size of such required software layer absent from such candidate host system;

based on the size, determining an estimated time to download such required software layer and extract such required software layer after downloaded; and determining the estimated time for launching the container on such candidate host system based on a cumulative of the estimated times to download the required software layers and extract such required software layers after downloaded on such candidate host system.

6. The information handling system of claim 5, wherein determining the estimated time for launching the container on such candidate host system is further based on one or more parameters associated with such candidate endpoint.

7. The information handling system of claim 6, wherein the one or more parameters comprise one or more of network conditions associated with such candidate endpoint, observed layer extraction times associated with such candidate endpoint, and transfer times for peer-to-peer layer transfer associated with such candidate endpoint.

8. A method comprising, in a distributed ecosystem comprising a plurality of host systems, responsive to a request to place a workload for execution in the distributed ecosystem:

determining required software layers for a container image for executing the workload;

determining candidate host systems among the plurality of host systems that meet hardware requirements for the execution of the workload; and calculating, for each of the determined candidate host systems among the of the plurality of host systems, a score;

wherein calculating the score for each of the determined candidate host systems comprises:

determining required software layers for the container image that are absent from the candidate host system;

determining a number of shared layers already available on the candidate host system;

determine a time expected to download and extract the determined absent layers;

based on the determined absent layers, the determined number of shared layers, and the determined time, calculating the score; and causing the container for the workload to be instantiated on a selected candidate host system that has the best score among the determined candidate host systems.

9. The method of claim 8, wherein determining the required layers for the container image comprises reading a container registry including information regarding the container and its constituent software layers.

10. The method of claim 8, wherein determining the candidate host systems among the plurality of host systems that meet the hardware requirements for execution of the workload comprises determining which of the plurality of host systems meet the hardware requirements for the workload.

11. The method of claim 8, wherein calculating the score for each candidate host system comprises, for such candidate host system:

determining an estimated time for launching the container on such candidate host system; and calculating the score based on the estimated time.

12. The method of claim 11, wherein determining the estimated time for launching the container on such candidate host system comprises, for each required software layer absent from such candidate host system:

determining a size of such required software layer absent from such candidate host system;

based on the size, determining an estimated time to download such required software layer and extract such required software layer after downloaded; and determining the estimated time for launching the container on such candidate host system based on a cumulative of the estimated times to download the required software layers and extract such required software layers after downloaded on such candidate host system.

13. The method of claim 12, wherein determining the estimated time for launching the container on such candidate host system is further based on one or more parameters associated with such candidate endpoint.

14. The method of claim 13, wherein the one or more parameters comprise one or more of network conditions associated with such candidate endpoint, observed layer extraction times associated with such candidate endpoint, and transfer times for peer-to-peer layer transfer associated with such candidate endpoint.

15. An article of manufacture comprising:

a non-transitory computer-readable medium; and computer-executable instructions carried on the computer-readable medium, the instructions readable by a processor, the instructions, when read and executed, for causing the processor to, in a distributed ecosystem comprising a plurality of host systems, responsive to a request to place a workload for execution in the distributed ecosystem:

determine required software layers for a container image for executing the workload;

determine candidate host systems among the plurality of host systems that meet hardware requirements for the execution of the workload; and calculate, for each of the determined candidate host systems of the plurality of host systems, a score;

wherein calculating the score for each of the determined candidate host systems comprises:

determine required software layers for the container image that are absent from the candidate host system;

determining a number of shared layers already available on the candidate host system;

determining a time expected to download and extract the determined absent layers;

based on the determined absent layers, the determined number of shared layers, and the determined time, calculating the score; and cause the container for the workload to be instantiated on a selected candidate host system that has the best score among the determined candidate host systems.

16. The article of claim 15, wherein determining the required layers for the container image comprises reading a container registry including information regarding the container and its constituent software layers.

17. The article of claim 15, wherein determining the candidate host systems among the plurality of host systems that meet the hardware requirements for execution of the workload comprises determining which of the plurality of host systems meet the hardware requirements or the workload.

18. The article of claim 15, wherein calculating the score for each candidate host system comprises, for such candidate host system:

determining an estimated time for launching the container on such candidate host system; and calculating the score based on the estimated time.

19. The article of claim 18, wherein determining the estimated time for launching the container on such candidate host system comprises, for each required software layer absent from such candidate host system:

determining a size of such required software layer absent from such candidate host system;

based on the size, determining an estimated time to download such required software layer and extract such required software layer after downloaded; and determining the estimated time for launching the container on such candidate host system based on a cumulative of the estimated times to download the required software layers and extract such required software layers after downloaded on such candidate host system.

20. The article of claim 19, wherein determining the estimated time for launching the container on such candidate host system is further based on one or more parameters associated with such candidate endpoint.

21. The article of claim 20, wherein the one or more parameters comprise one or more of network conditions associated with such candidate endpoint, observed layer extraction times associated with such candidate endpoint, and transfer times for peer-to-peer layer transfer associated with such candidate endpoint.

* * * * *